Figure 1:
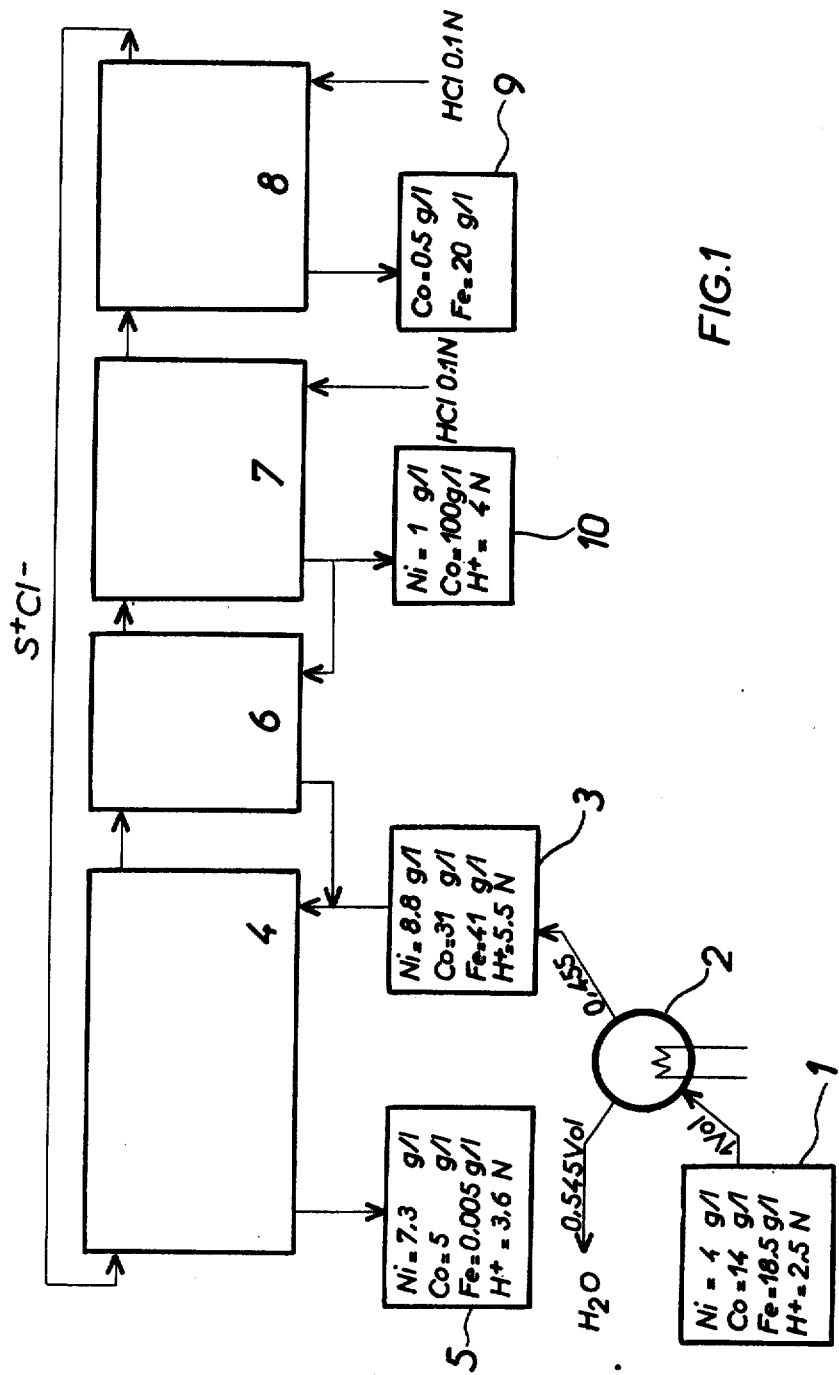

United States Patent [19]
Gandon

[11] 3,884,681
[45] May 20, 1975

[54] PROCESS FOR THE PRODUCTION OF HIGH-PURITY METALS FROM NICKELIFEROUS MATTES

[75] Inventor: Louis Gandon, Rambouillet, France
[73] Assignee: Le Nickel, Paris Cedex 15, France
[22] Filed: Nov. 28, 1973
[21] Appl. No.: 419,534

[30] Foreign Application Priority Data
Dec. 1, 1972   France .............................. 72.42775

[52] U.S. Cl. ................... 204/113; 75/114; 75/119; 75/101 BE; 423/139; 423/493
[51] Int. Cl. ......................... C22d 1/14; C22b 3/00
[58] Field of Search ............ 75/101 BE, 101 R, 119, 75/114; 423/139, 493; 204/113

[56] References Cited
UNITED STATES PATENTS

| | | | |
|---|---|---|---|
| 3,380,801 | 4/1968 | Williams et al. ................ | 75/101 BE |
| 3,399,055 | 8/1968 | Ritcey et al. ......................... | 75/119 |
| 3,540,860 | 11/1970 | Cochran ........................ | 75/101 BE |
| 3,660,026 | 5/1972 | Michel et al. ......................... | 75/119 |
| 3,661,564 | 5/1972 | Gandon et al. ................. | 75/101 BE |
| 3,718,458 | 2/1973 | Ritcey et al. ..................... | 75/101 BE |
| 3,752,745 | 8/1973 | Kane et al. ............................ | 75/119 |

Primary Examiner—R. L. Andrews
Attorney, Agent, or Firm—Fleit & Jacobson

[57] ABSTRACT

In a method for producing high-purity nickel from impure nickel matte containing cobalt and other impurities including comminuting and roasting the impure matte; dissolving the resulting impure nickel oxide in concentrated hydrochloric acid; oxidizing the iron in the resulting solution to the ferric state, removing the impurities from the solution by means of ion-exchange resin to produce a purified nickel chloride solution and selectively eluting the impurities to recover a cobalt chloride solution; and subjecting the purified nickel chloride solution to an electrolysis to recover high-purity nickel, the improvement in which the ion-exchange resin containing the impurities is eluted by means of approximately decinormal hydrochloric acid, the eluate is concentrated and then placed in contact with an organic phase in a first liquid-liquid extraction to yield an at least partly purified aqueous solution of nickel and cobalt chloride, the organic phase is washed and then subjected to cobalt re-extraction, the organic phase is then subjected to iron re-extraction, and then the organic phase is recycled to the first liquid-liquid extraction.

7 Claims, 2 Drawing Figures

PROCESS FOR THE PRODUCTION OF HIGH-PURITY METALS FROM NICKELIFEROUS MATTES

The invention concerns the production of nickel and byproduct metals.

A process has been described in our British Pat. Application No. 24283/72 for the production of high-purity nickel, that is to say of a degree of purity exceeding 99.95%, from nickeliferous mattes. This process comprises the following steps: (a) communiting said matte and roasting said matte at a temperature of approximately 900°C to obtain nickel oxide; (b) dissolving this impure nickel oxide in concentrated hydrochloric acid; (c) oxidizing to the ferric state the iron which is contained in the impure solution resulting from the preceding step; (d) removing the impurities from this solution by means of an ion-exchange resin and eluting said impurities to recover cobalt; and (e) subjecting the purified solution to an electrolysis to recover high-purity nickel.

The present invention relates to improvements in this process, and more particularly to the processing of the washings obtained during step (d) for removing the impurities by an ion-exchange resin.

As stated in that Patent Application, such an ion-exchange resin may be washed with approximately decinormal hydrochloric acid, optionally after rinsing with concentrated hydrochloric acid. The solution obtained during the washing, that is, the "eluate", contains the impurities which had been adsorbed on the resin, and the present invention seeks to render it possible to recover (and possibly to separate) the metals of value such as nickel and cobalt contained in the eluate.

According to the present invention, there is provided a process as claimed in claim 1 of Patent Application No. 24283/72, wherein the ion-exchange resin containing said impurities is washed with approximately decinormal hydrochloric acid to elute said impurities, and wherein the process further comprises concentrating the eluate obtained, contacting the eluate with an organic phase in a first liquid-liquid extraction to yield an at least partly purified aqueous solution of nickel and cobalt chlorides, washing the organic phase, subjecting the organic phase to cobalt re-extraction to produce an aqueous solution rich in cobalt, subjecting the organic phase to iron re-extraction and then recycling the organic phase to said first liquid-liquid extraction. Recovered nickel and cobalt, in metallic, salt or salt solution form, are included in the invention.

The said organic extraction phase preferably contains a sulphone chloride diluted in an appropriate reagent, for example such as a mixture of di-isobutylketone and octylol.

The re-extraction of the cobalt and that of iron are advantageously performed by placing the organic extraction phase in contact with a hydrochloric solution of substantially decinormal strength, which is then separated, for example by decanting.

A part of the aqueous solution obtained after the organic phase has been placed in contact with the same during the said operation for cobalt re-extraction, is preferably used for the said washing operation and then recycled to the stage of the said liquid-liquid extraction.

In a first form of embodiment of the invention, the ion-exchange resin is rinsed with concentrated hydrochloric acid before being washed, which action yields the initial solution for the process corresponding to the present addition.

In another form of embodiment, this rinsing with concentrated hydrochloric acid is omitted, and in this case a part of the purified solution of nickel chloride produced is combined with the initial eluate, prior to concentration, to increase its complexing capacity; that is, no rinsing operation is performed on the ion-exchange resin prior to the washing with approximately decinormal hydrochloric acid, and wherein a part of the said purified solution of nickel chloride is added to the said eluate before the concentrating operation.

Figure 2:
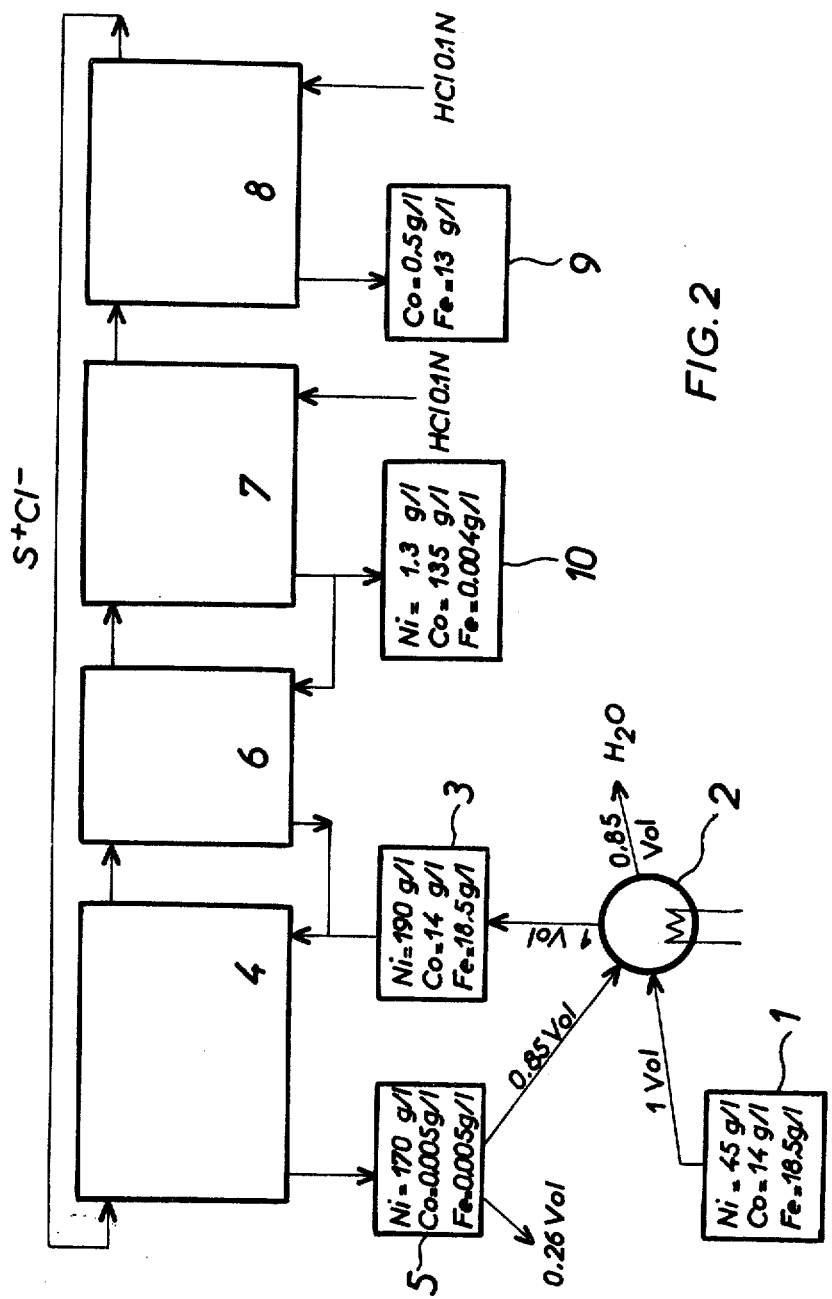

The invention will now be described, purely by way of example, with reference to the accompanying drawings, in which:

FIG. 1 is a diagram of the principal stages of a process according to the present invention, in which the solution to be processed is obtained after rinsing an ion-exchange resin with concentrated hydrochloric acid; and FIG. 2 is analogous to FIG. 1 but relates to a case where the rinsing of FIG. 1 is omitted.

Operations and solutions which are identical or perform the same function have been given the same reference numerals in both figures. An Example corresponding to each figure is now given.

EXAMPLE 1

This is an example of a process according to FIG. 1. The solution to be processed is obtained as in Patent Application No. 24283/72 from an ion-exchange resin column through which an impure solution of nickel chloride has been passed to purify the latter. The resin is rinsed with concentrated hydrochloric acid and then washed with approximately decinormal hydrochloric acid.

The eluate from the decinormal acid is the solution 1 to be processed according to the present invention, and from FIG. 1 the concentrations (which are purely exemplary) of nickel, cobalt, iron and $H^+$ therein are seen to be:

| | | |
|---|---|---|
| Ni : | 4 | grammes/litre |
| Co : | 14 | grammes/litre |
| Fe : | 18.5 | grammes/litre |
| $H^+$ : | 2.5 | moles/litre |

This eluate 1 is subjected to a concentration 2 such that one volume of the solution 1 provides 0.545 volumes of water and 0.455 volumes of a concentrated solution 3 whose composition is (naturally) the following:

| | | |
|---|---|---|
| Ni : | 8.8 | grammes/litre |
| Co : | 31 | grammes/litre |
| Fe : | 41 | grammes/litre |
| $H^+$ : | 5.5 | moles/litre. |

The concentrated solution solution 3 is then subjected to a liquid-liquid extraction 4 with an organic phase, $S^+Cl^-$ in FIG. 1. The organic phase consists of sulphonium chloride solution in a mixture of di-isobutylketone and 20 volume percent octylol. The extraction 4 is performed with 5 volumes of organic phase per volume of aqueous phase by the counterflow method, for instance in eight stages each of which consists of a conventional mixer-decanter.

A partially purified solution 5 is thus obtained, which contains 7.3 grammes/litre of nickel, 5 grammes/litre of cobalt, 3.6 moles/litre of H⁺, and less than 0.005 gramme/litre of iron.

Meanwhile, the organic phase which had been used for extraction 4 is then subjected in turn, still by the counterflow method, to washing 6, cobalt re-extraction 7 and iron re-extraction 8. This last is performed by means of decinormal aqueous hydrochloric acid in six stages with 2.9 volumes of the organic phase per volume of the aqueous phase, and yields a solution 9 which contains 0.5 grammes/litre of cobalt and 20 grammes/litre of iron, this numeral well corresponding with the apparent total iron drawn off during the extraction 4, after allowing for the dilution produced by adding hydrochloric acid during the re-extraction 8.

The cobalt re-extraction 7 is performed in six stages by means of one volume of decinormal hydrochloric acid to 13 volumes of organic phase in this case. The solution 10 obtained contains 1 gramme/litre of nickel, 4 moles/litre of H⁺ and 100 grammes/litre of cobalt.

A part of this solution 10 is used for the washing action 6, which is performed in four stages with 43 volumes of organic phase per volume of aqueous solution 10, which, after having washed the organic phase at 6, is combined with the concentrated solution 3 issuing from the concentrating operation 2 and being led to the liquid-liquid extraction 4.

After the iron re-extraction 8, the organic phase $S^+Cl^-$ is used again for the extraction 4.

It will be noticed that this process renders it possible totally to eliminate the iron contained in the initial solution 1 and to isolate it in a solution 9 containing little cobalt and negligible nickel. Moreover, the process yields a cobaltiferous solution 10 with a nickel content as low as 1% by weight that of the cobalt, which may easily be recovered. As for the partially purified solution 5, it may be recycled to a relatively upstream point of the process of Patent Application No. 24283/72.

EXAMPLE II

This is an Example of a process according to FIG. 2. The solution to be processed is obtained by washing out a resin column through which an impure solution of nickel chloride had been passed as in Example 1, but in this case, the rinsing action with dilute hydrochloric acid which had preceded the washing-out action has been omitted. This has the result of drawing off a greater quantity of nickel and the initial eluate 1 indeed has the following composition:

| | | |
|---|---|---|
| Ni : | 45 | grammes/litre |
| Co : | 14 | grammes/litre |
| Fe : | 18.5 | grammes/litre |
| H⁺ : | 0.2 | moles/litre. |

Since the operation corresponding to the present example are very similar to those of Example I, except for the actual numerical values, they will be but briefly described.

After a concentrating operation 2, a concentrated solution 3 is obtained which contains 190 grammes/litre of nickel, 14 grames/litre of cobalt and 18.5 grammes/litre of iron. This concentrated solution 3 is subjected to a countercurrent liquid-liquid extraction 4 resulting in a purified solution 5. The organic phase $S^+Cl^-$ differs from that of the preceding Example only in the concentration of the sulphonium chloride, which in the present Example amounts to no more than 0.3 mol per litre.

As previously, this organic phase is subjected to washing 6, to cobalt re-extraction 7 and to iron re-extraction 8. The following table shows - for each stage - the number of extraction or washing operations and the volumetric ratio of the organic phase to the aqueous phase (O/A):

| Stage | Number of operations. | O/A |
|---|---|---|
| extraction 4 | 8 | 2.8 |
| washing 6 | 4 | 68 |
| Co re-extraction 7 | 6 | 20.8 |
| Fe re-extraction 8 | 6 | 2 |

A solution 5 of nickel chloride is obtained as in Example 1 but here is practically denuded of cobalt; a solution 9 is obtained at the outlet from the iron re-extraction operation 8 broadly similar to the solution 9 of Example 1; likewise a solution 10 is obtained at the outlet from the cobalt extraction operation 7. As in the preceding Example, a part of the solution 10 is used for the washing action 6. On the other hand, a part of the purified solution 5 is here recycled to the concentrating operation 2 to increase the chloride content of the solution which is to be processed. As is apparent from FIG. 2, the rates of flow and the concentrating action are controlled so that each volume of initial solution 1 enters the concentrating plant together with 0.85 volumes of purified solution 5; one volume of concentrated solution is discharged and the remaining 0.85 volumes, which are constituted by water, are removed. 0.26 volumes of purified solution 5 remain available for outside use for each 0.85 volumes recycled to the concentrating plant.

The compositions in grammes/litre of the different solutions obtained are as follows:

| | Ni | Co | Fe |
|---|---|---|---|
| Solution 5 | 170 | 0.005 | 0.005 |
| Solution 9 | — | 0.05 | 13 |
| Solution 10 | 1.3 | 135 | 0.004 |

It will be noted that the solution 5 of nickel chloride is obtained practically denuded of cobalt and iron; the cobaltiferous solution 10 contains but little nickel. The nickel lost (i.e. not obtained either in solution 5 or 10) may be considered as practically nought, and very little cobalt is drawn along into the iron re-extraction solution 9; this is despite the fact that the initial eluate was obtained without hydrochloric-acid rinsing and contained a higher proportion of nickel.

Other organic reagents than sulphonium chloride could be used for the liquid-liquid extraction.

Moreover, although the preceding examples were restricted to the extraction of iron and cobalt, other impurities could be extracted in the same manner.

It is thus possible to obtain, on the one hand, a purified solution of chlorides of nickel and of cobalt at the outlet from the operation of liquid-liquid extraction and, on the other hand, a solution of cobalt chloride at the outlet of the operation for cobalt re-extraction. Experience has shown that the process corresponding to the invention can provide advantageous results. Thus, the cobalt chloride solution contains very little nickel, and but little cobalt is drawn off with the iron during re-extraction of this last element.

What we claim is:

1. In a method for producing high-purity nickel from impure nickel matte containing cobalt and other impurities comprising successively the following steps: a) comminuting and roasting said impure matte at a temperature of about 900°C to obtain impure nickel oxide; (b) dissolving this impure nickel oxide in concentrated hydrochloric acid; c) oxidizing to the ferric state the iron which is contained in the impure solution resulting from the preceding step; (d) removing the impurities from this solution by means of ion-exchange resin to produce a purified nickel chloride solution and selectively eluting said impurities to recover a cobalt chloride solution; and e) subjecting the purified nickel chloride solution to an electrolysis to recover high-purity nickel; the improvement according to which said ion-exchange resin containing said impurities is eluted with approximately decinormal hydrochloric acid, the eluate obtained is concentrated and then contacted with an organic phase in a first liquid-liquid extraction to yield an at least partly purified aqueous solution of nickel and cobalt chlorides, the organic phase is washed and then subjected to cobalt re-extraction to produce an aqueous solution rich in cobalt, the organic phase is then subjected to iron re-extraction and then recycled to said first liquid-liquid extraction.

2. A method as claimed in claim 1, wherein said cobalt re-extraction comprises contacting said organic phase with an approximately decinormal hydrochloric acid solution.

3. A method as claimed in claim 2, wherein a part of the aqueous solution obtained after said cobalt re-extraction operation is used for said washing of the organic phase, and is then recycled to said first liquid-liquid extraction.

4. A method as claimed in claim 1, wherein the organic phase comprises sulphonium chloride.

5. A method as claimed in claim 4, wherein the organic phase comprises di-isobutylketone and octylol.

6. A method as claimed in claim 1, wherein said iron re-extraction comprises contacting said organic phase with an approximately decinormal hydrochloric acid solution.

7. A method as claimed in claim 1, wherein no rinsing operation is performed on the ion-exchange resin prior to the washing with approximately decinormal hydrochloric acid, and wherein a part of the said purified solution of nickel chloride is added to the said eluate before the concentrating operation.

* * * * *